(12) United States Patent
Rager

(10) Patent No.: US 10,484,542 B1
(45) Date of Patent: Nov. 19, 2019

(54) SYSTEM AND METHOD FOR HYBRIDIZED CHAT AUTOMATION

(71) Applicant: GENESYS TELECOMMUNICATIONS LABORATORIES, INC., Daly City, CA (US)

(72) Inventor: Brent Rager, Indianapolis, IN (US)

( * ) Notice: Subject to any disclaimer, the term of this patent is extended or adjusted under 35 U.S.C. 154(b) by 0 days.

(21) Appl. No.: 16/235,628

(22) Filed: Dec. 28, 2018

(51) Int. Cl.
*H04M 3/51* (2006.01)
*H04L 12/58* (2006.01)
*G06F 17/27* (2006.01)

(52) U.S. Cl.
CPC ...... *H04M 3/5183* (2013.01); *G06F 17/2765* (2013.01); *H04L 51/02* (2013.01)

(58) Field of Classification Search
CPC ... H04M 3/5183; H04M 3/5191; H04L 51/02; H04L 51/00; H04L 51/04
USPC .... 379/265.09, 242, 265.05, 265.07, 265.11, 379/265.01, 88.17, 247, 265.13
See application file for complete search history.

(56) References Cited

U.S. PATENT DOCUMENTS

2017/0324868 A1* 11/2017 Tamblyn ............. H04M 3/5191
2018/0375998 A1* 12/2018 Beilis ................ H04M 3/5175

* cited by examiner

*Primary Examiner* — Thjuan K Addy

(57) ABSTRACT

In a system for managing blended agent and automated chat in a contact center setting, the system includes: a chat orchestration server invoking natural language processing on a received communication, selecting a standardized text communication responsive to the natural-language-processed communication, and transmitting the standardized text communication to an agent device; and a knowledge management server for determining confidence values and populating ranked lists of responsive standardized text communications.

20 Claims, 6 Drawing Sheets

US 10,484,542 B1

SYSTEM AND METHOD FOR HYBRIDIZED CHAT AUTOMATION

BACKGROUND OF THE INVENTION

In the field of customer communications and services, an organization such as a retail company, a service company, or a non-profit organization may operate a website for providing information to customers and clients and/or for providing an entry point of communication with a contact center. In addition to the website, the organization may also operate a contact center (e.g., a customer service or sales contact center) staffed by agents who communicate with customers through a variety of media, such as a telephone or other audio/visual communication channel, interactive text chat systems, short message service (SMS), social media, co-browsing, email, letters, fax, etc.

Visitors to an organization's website may be presented with information and opportunities for contacting representatives of the organization at the contact centers. These opportunities can include chat boxes and windows integrated into a web page for real-time text-based communications or links to email addresses for time-shifted text-based communications.

Portions of outbound text-based communications originating from the contact center may be automated. This disclosure generally relates to improving the efficiency in generating outbound text-based communications provided by an agent in a contact center in response to an inbound text-based communication provided by a customer of the contact center.

SUMMARY

In an embodiment, a method is disclosed for managing a chat in a contact center setting, wherein the chat comprises a blended agent and automated chat, the method performing the steps of receiving from a chat orchestration server a first signal indicating an initiating communication; invoking by the chat orchestration server natural-language-processing on the initiating communication; retrieving, by the chat orchestration server, a standardized text communication responsive to the natural-language-processed communication from a memory coupled to a knowledge management server; determining, by the knowledge management server, a confidence value of the standardized text communication responsive to the natural-language-processed communication; populating, by the knowledge management server, a determined ranked order of standardized text communications, wherein the rank order is configured in response to the confidence value of the standardized text communication; transmitting, by the chat orchestration server, an instruction to display on an agent device the determined ranked order; receiving, by the chat orchestration server, a second signal indicating a selection from the agent device of a standardized text communication responsive to the natural-language-processed initiating communication; directing, by the chat orchestration server, an automated standardized-text-communication chat for communication with an end user based on the received second signal indicating the selection from the agent device of the standardized text communication; and then repeating the above steps until an action occurs as indicated by a third signal received by the chat orchestration server.

In an embodiment, a disclosed method includes the initiating communication as a chat-based communication from an end user.

In an embodiment, a disclosed method includes the end user interacting with the contact center through a webchat.

In an embodiment, a disclosed method includes the steps of retrieving, by the chat orchestration server, a standardized text communication responsive to the natural-language-processed communication from a memory coupled to a knowledge management server, and determining, by the knowledge management server, a confidence value of the standardized text communication responsive to the natural-language-processed communication are repeated for a plurality of standardized text communications responsive to the natural-language-processed communication, and the ranked order of the determined standardized text communications is comprised of said plurality of standardized text communications responsive to the natural-language-processed communication.

In an embodiment, a disclosed method includes the knowledge management server live trains the confidence value of the standardized text communication in response to the selection from the agent device of a standardized text communication responsive to the natural-language-processed initiating communication.

In an embodiment, a disclosed method includes determining, by the knowledge management server, a threshold for the determined confidence value of the standardized text communication responsive to the natural-language-processed communication; and transmitting, by the knowledge management server, the standardized text communication for population in the ranked order if the determined confidence value meets or exceeds the determined threshold.

In an embodiment, a disclosed method includes the determined confidence values of a plurality of standardized text communications responsive to the natural-language-processed communication which influences the determined threshold.

In an embodiment, a disclosed method includes the knowledge management server configured to live train the confidence value of the standardized text communication if the confidence value is below the determined threshold.

In an embodiment, a disclosed method includes the live training of the confidence value of the standardized text communication that is determined in response to the selection from the agent device of a standardized text communication responsive to the natural-language-processed initiating communication.

In an embodiment, a disclosed method includes the third signal received by the chat orchestration server that indicates completion of a chat conversation between the end user and an agent operating the agent device.

In an embodiment, a system is disclosed for managing chat in a contact center setting, wherein the chat comprises a blended agent and automated chat, the system comprises a chat orchestration server processor; a memory coupled to the chat orchestration server processor, wherein the memory stores instructions that, when executed by the chat orchestration server processor, cause the chat orchestration server processor to: receive a first signal indicating an initiating communication; invoke natural language processing on the initiating communication; retrieve a standardized text communication responsive to the natural-language-processed communication from a memory coupled to a knowledge management server; transmit an instruction to display on an agent device a determined ranked order of standardized text communications; receive a second signal indicating a selection from an agent device of a standardized text communication responsive to the natural-language-processed initiating communication; direct an automated standardized-textcommunication chat for communication with an end user based on the received second signal indicating the selection from the agent device of the standardized text communications; a knowledge management server processor; a memory coupled to the knowledge management server processor, wherein the memory stores instructions that, when executed by the knowledge management server processor, cause the knowledge management server processor to: determine a confidence value of the standardized text communication responsive to the natural-language-processed communication; populate the determined ranked order of standardized text communications, wherein the rank order is configured in response to the confidence value of the standardized text communication.

In an embodiment, a disclosed system including the initiating communication as a chat-based communication from an end user.

In an embodiment, a disclosed system includes the end user interacting with the contact center through a webchat.

In an embodiment, a disclosed system includes the instructions that cause the chat orchestration server processor to retrieve a standardized text communication responsive to the natural-language-processed communication from a memory coupled to a knowledge management server, and the instructions that cause the knowledge management server processor to determine a confidence value of the standardized text communication responsive to the natural-language-processed communication are repeated for a plurality of standardized text communications responsive to the natural-language-processed communication, and wherein the ranked order of standardized text communications populated by the knowledge management server processor is comprised of said plurality of standardized text communications responsive to the natural-language-processed communication.

In an embodiment, a disclosed system includes the instructions causing the knowledge management server processor to live train the confidence value of the standardized text communication in response to the selection from the agent device of a standardized text communication responsive to the natural-language-processed initiating communication.

In an embodiment, a disclosed system includes the instructions that further cause the knowledge management server processor to determine a threshold for the determined confidence value of the standardized text communication responsive to the natural-language-processed communication; and transmit the standardized text communication for population in the ranked order if the determined confidence value meets or exceeds the determined threshold.

In an embodiment, a disclosed system includes the determined confidence values of a plurality of standardized text communications responsive to the natural-language-processed communication influencing the determined threshold.

In an embodiment, a disclosed system includes the knowledge management server processor configured with instructions to live train the confidence value of the standardized text communication if the confidence value is below the determined threshold.

In an embodiment, a disclosed system includes the live training of the confidence value of the standardized text communication determined in response to the selection from the agent device of a standardized text communication responsive to the natural-language-processed initiating communication.

In an embodiment, a disclosed system includes the instructions for the chat orchestration server processor and the knowledge management server configured to repeat until an action occurs as indicated by a third signal received by the chat orchestration server processor.

DETAILED DESCRIPTION

Figure 1:
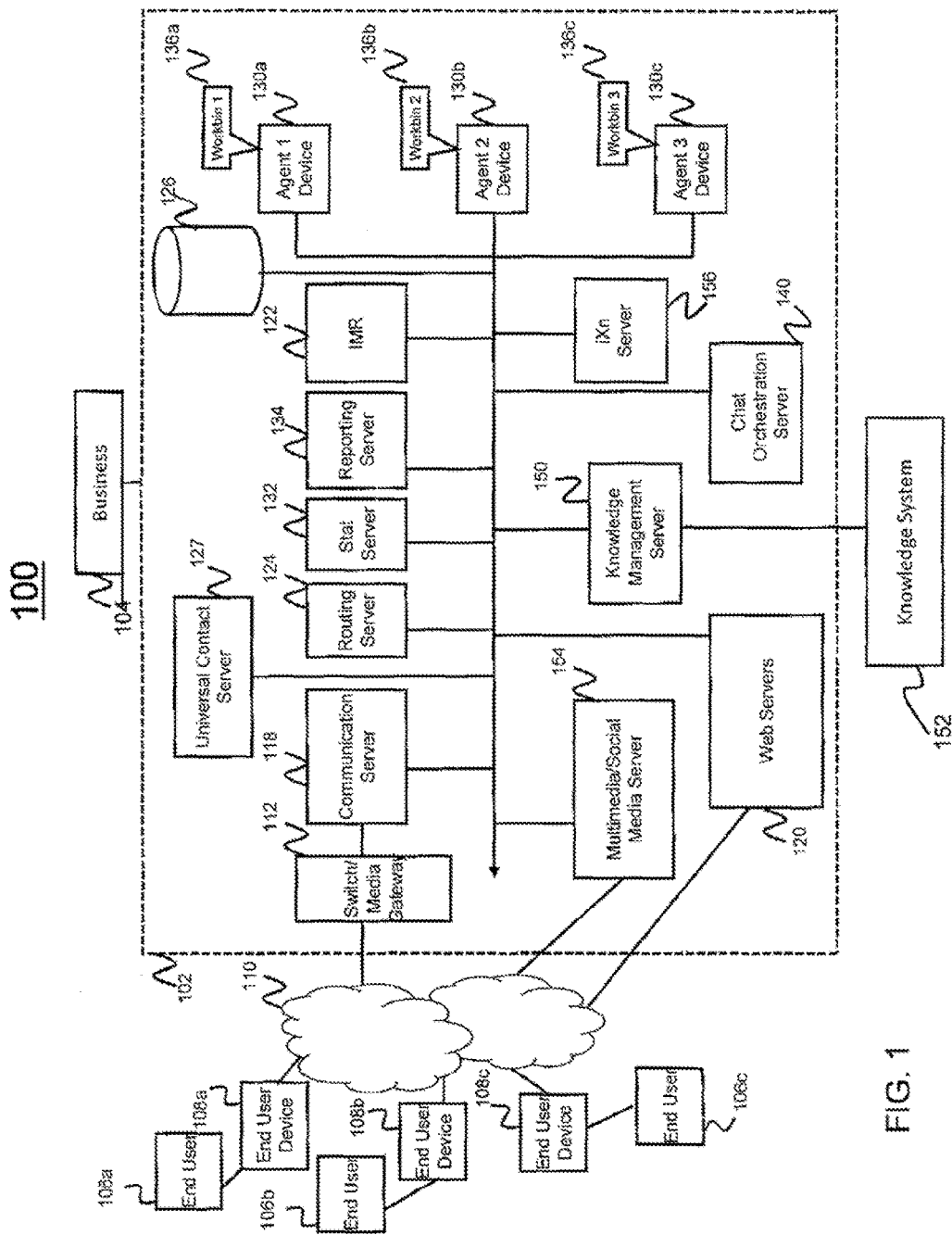
FIG. 1 is an embodiment of a block diagram of a contact center system.

The present disclosure is directed to the improvement in efficacy and efficiency in deploying automation of a contact center's text-based communications. The deployment and integration of automated text-based communication protocols, commonly known as "chat bot," have attempted to minimize or altogether eliminate the need for agents to provide real-time text-based communications in a contact center. A chat bot can utilize systems deploying any number of automation technologies, (e.g., natural language process, machine learning, and artificial intelligence, etc.) that attempt to mimic outbound text-based communications from a contact center. As artificial technologies used to deploy chat bots have continued to evolve, however, the chat bots exhibit the problem of the uncanny valley of human interaction. Although the chat bot dialogue bears the resemblance to the dialogue of a human being, because it appears almost, but not exactly, like a conversation with a real human being, it elicits an uncanny, or strangely familiar, feeling of eeriness and revulsion in an observer. Customers of a contact center expecting a human interaction in a text-based communication may avoid or cease using the text-based communication if the customer finds the interaction unsettling when the responses from the chat bot are insufficiently humanlike. Thus, it may not be desirable to replace all real-time text-based communications in a contact center with chat bots, but rather hybridize the automation of chat bots working in concert with a live agent.

Prewritten standardized text responses are an example of an automation in communications originating from a contact center. The deployment of a contact center may include a configurable database of standardized text responses provided by an agent of the contact center that are responsive to typical statements and questions that the customers of a contact center may pose. These standardized text responses may be used as a reply into any outbound interaction from an agent to customer of a contact center, such as an email or a chat message, or the standardized text responses can be read by an agent to the customer during a phone interaction. An example of a standardized text response might include, in response to an anticipated question posed by a customer of the contact center, of "What are your business hours," with a standardized text response available to say, "Monday to Friday, 8 AM-6 PM". Standardized text responses may be deployed as static text, with little ability of the agent utilizing the standardized text responses to change the content of the standardized text response, other than sometimes being able to replace placeholders within the statement with interaction attributes. Contact center agents can review the inbound text-based communication from a customer and use a standardized text response to communicate with their respective customers. However, the agents may have to manually receive and respond to the information the standardized text response requests in order for the agent to continue the conversation with the customer.

The present disclosure builds upon standardized text responses through the creation of standardized text conversations deployed in a contact center's text-based communication systems. A standardized text conversation comprises a short real-time text-based conversation in a contact center that a chat bot can have with the customer on behalf of the agent, as deployed by an agent. A standardized text conversation can be deployed in a manner similar to a standardized text response. In a disclosed embodiment, an agent of a contact center is able to select a standardized text conversation in response to an incoming conversation from a customer in order to gather a specific set of information from the customer. Information gathering and handling common questions or workflows on behalf of the agent can be performed through standardized text conversations. As an example of a standardized text conversation, a customer utilizing the chat feature of a contact center could ask to see their bill. In response, the agent can use a standardized text conversation to acquire information required for the agent to retrieve the bill, such as the customer's name, date of birth and last four digits of their social security number, etc. The use of standardized text conversations improves efficiency of the contact center by letting the system gather the customer information, which permits the agent more time to handle other interactions, while the agent is able to maintain some degree of control over the conversation with the customer. The hybridization of a human agent and automated chat bot may achieve optimization of human and computer resources in supporting text-based communication systems.

FIG. 1 is a block diagram of an embodiment of a contact center system 100, according to a disclosed embodiment. In some embodiments, the contact center system 100 may operate as a system for engaging and managing conversations between an automated chat robot and human users (hereinafter referred to as a chat automation system 102). The chat automation system 102 may be an in-house facility to a business or enterprise 104 for serving the enterprise in performing the functions of sales and service relative to the products and services available through the enterprise. In another aspect, the contact center system 100 may be operated by a third-party service provider. According to another embodiment, the contact center system 100 may operate as a hybrid system in which some components of the contact center system 100 are hosted at the contact center premise and other components are hosted remotely (e.g., in a cloud-based environment). The contact center system 100 may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center may also be distributed across various geographic locations and computing environments and not necessarily contained in a single location, computing environment, or even computing device.

According to one example embodiment, the contact center system 100 includes resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers or end users, e.g., end users 106a-c, and collectively referenced as end user 106) desiring to receive services from the contact center system 100 or the business 104 may initiate an inbound communication to the contact center system 100 via their end user devices 108a-108c (collectively referenced as electronic device 108).

Each of the electronic devices 108 may be a communication device conventional in the art, such as, for example, a telephone, wireless phone, smart phone, personal computer, electronic tablet, and/or the like, that is configured to engage in text-based (e.g., chat) communications with other electronic devices. According to some embodiments, users operating the electronic devices 108 may communicate with the contact center system 100 by way of a voice channel, and the communication may be converted into text either at the end user or contact center side. The text may then be transmitted to a chat bot (described in more detail below), and the response from the chat bot may be converted back into speech or delivered to the end user's device as text. Users operating the electronic devices 108 may initiate, manage, and respond to telephone calls, emails, chats, text messaging, web-browsing sessions, and other multi-media transactions.

Inbound and outbound communications from and to the electronic devices 108 may traverse the telephone, cellular, and/or data communication network 110 depending on the type of device that is being used. For example, the communications network 110 may include a private or public switched telephone network (PSTN), local area network (LAN), private wide area network (WAN), and/or public wide area network such as, for example, the Internet. The communications network 110 may also include a wireless carrier network including a code division multiple access (CDMA) network, global system for mobile communications (GSM) network, and/or any 3G or 4G network conventional in the art.

According to one exemplary embodiment, the chat automation system 102 includes a switch/media gateway 112 coupled to the communications network 110 for receiving and transmitting telephony interactions between end users and the chat automation system 102. The switch/media gateway 112 may include a telephony switch or communication switch configured to function as a central switch for agent level routing within the center. The switch may be a hardware switching system or a soft switch implemented via software. In this regard, the switch 112 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony device. In this example, the switch/media gateway establishes a voice path/connection (not shown) between the calling customer and the agent telephony device, by establishing, for example, a connection between the customer's telephony device and the agent telephony device.

According to one exemplary embodiment of the invention, the switch is coupled to a communication server 118 which may, for example, serve as an adapter or interface between the switch and the remainder of the routing, monitoring, and other communication-handling components of the contact center.

The communication server 118 may be configured to process PSTN calls, VoIP calls, and the like. For example, the communication server 118 may be configured with computer-telephony integration (CTI) software for interfacing with the switch/media gateway and contact center equipment. In one embodiment, the communication server 118 may include a session initiation protocol (SIP) server for processing SIP calls. According to some exemplary embodiments, the communication server 118 may, for example, extract data about the customer interaction such as the caller's telephone number, often known as the automatic number identification (ANI) number, or the customer's internet protocol (IP) address, or email address, and communicate with other CC components in processing the interaction.

According to one exemplary embodiment of the invention, the system further includes an interactive media response (IMR) server 122, which may also be referred to as a self-help system, virtual assistant, or the like. The IMR server 122 may be similar to an interactive voice response (IVR) server, except that the IMR server 122 is not restricted to voice but may cover a variety of media channels including voice. Taking voice as an example, however, the IMR server may be configured with an IMR script for querying customers on their needs. For example, a contact center for a bank may tell customers, via the IMR script, to "press 1" if they wish to get an account balance. If this is the case, through continued interaction with the IMR server 122, customers may complete service without needing to speak with an agent. The IMR server 122 may also ask an open-ended question such as, for example, "How can I help you?" and the customer may speak or otherwise enter a reason for contacting the contact center. The customer's response may then be used by the routing server 124 to route the call or communication to an appropriate chat automation system 102 resource.

If the communication is to be routed to an agent, the communication server 118 interacts with a routing server 124 to find an appropriate agent for processing the interaction. The selection of an appropriate agent for routing an inbound interaction may be based, for example, on a routing strategy employed by the routing server 124, and further based on information about agent availability, skills, and other routing parameters provided, for example, by a statistics server 132.

In some embodiments, the routing server 124 may query a customer database, which stores information about existing clients, such as contact information, service level agreement (SLA) requirements, nature of previous customer contacts and actions taken by contact center to resolve any customer issues, and the like. The database may be managed by any database management system conventional in the art, such as Oracle, IBM DB2, Microsoft SQL server, Microsoft Access, PostgreSQL, MySQL, FoxPro, NoSQL, SQLite, and the like, and may be stored in a mass storage device 126. The routing server 124 may query the customer information from the customer database via an ANI or any other information collected by the IMR 122.

Once an appropriate agent is identified as being available to handle a communication, a connection may be made between the customer and an agent device 130*a*-130*c* (collectively referenced as 130) of the identified agent. Collected information about the customer and/or the customer's historical information may also be provided to the agent device for aiding the agent in better servicing the communication. In this regard, each agent device 130 may include a telephone adapted for regular telephone calls, VoIP calls, and the like. The agent device 130 may also include a computer for communicating with one or more servers of the contact center and performing data processing associated with contact center operations, and for interfacing with customers via voice and other multimedia communication mechanisms.

The contact center system may also include a multimedia/social media server 154 for engaging in media interactions other than voice interactions with the end user devices 108. The media interactions may be related, for example, to email, vmail (voice mail through email), chat, video, text-messaging, web, social media, co-browsing, and the like. In this regard, the multimedia/social media server 154 may take the form of any IP router conventional in the art with specialized hardware and software for receiving, processing, and forwarding multi-media events. According to some embodiments, the multimedia/social media server 154 may be configured to maintain chat conversations, generate chat transcripts, and determine whether or not a chat communication is completed (e.g., based on timeout or by a customer closing a chat window). Additionally, the multimedia/social media server 154 may be configured to keep a chat session alive even when a particular chat server instance crashes, and also process or facilitate chat transfers and conference sessions.

The web servers 120 may include, for example, social interaction site hosts for a variety of known social interaction sites to which an end user may subscribe, such as, for example, Facebook, Twitter, and the like. In this regard, although in the embodiment of FIG. 1 the web servers 120 are depicted as being part of the chat automation system 102, the web servers may also be provided by third parties and/or be maintained outside of the contact center. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, in addition to real-time interactions, deferrable (also referred to as back-office or offline) interactions/activities may also be routed to the contact center agents. Such deferrable activities may include, for example, responding to emails, responding to letters, attending training seminars, or any other activity that does not entail real time communication with a customer. In this regard, an interaction (iXn) server 156 interacts with the routing server 124 for selecting an appropriate agent to handle the activity. Once assigned to an agent, an activity may be pushed to the agent, or may appear in the agent's workbin 136*a*-136*c* (collectively referenced as 136) as a task to be completed by the agent. The agent's workbin may be implemented via any data structure conventional in the art, such as, for example, a linked list, array, and/or the like. The workbin 136 may be maintained, for example, in buffer memory of each agent device 130.

According to one exemplary embodiment of the invention, the mass storage device(s) 126 may store one or more databases relating to agent data (e.g. agent profiles, schedules, etc.), customer data (e.g., customer profiles), interaction data (e.g., details of each interaction with a customer, including reason for the interaction, disposition data, time on hold, handle time, etc.), and the like.

According to one embodiment, some of the data (e.g., customer profile data) may be maintained in a customer relations management (CRM) database hosted in the mass storage device 126 or elsewhere. The mass storage device may take form of a hard disk or disk array, flash memory, magnetic table, or other suitable mass storage device as is conventional in the art, for storing information used as part of the contact center system 100 and the chat automation system 102.

According to some embodiments, the chat automation system 102 may include a universal contact server (UCS) 127, configured to retrieve information stored in the CRM database and direct information to be stored in the CRM database. For example, the UCS 127 may be utilized as part of the chat automation system 100 to facilitate maintaining a history on how well a particular chat bot (described in more detail below) functions for a given customer as a reference for future chat communications. The UCS 127 may also be configured to facilitate maintaining a history of customers' preferences regarding media channels, such as instances in which chat communications are acceptable and instances in which customers prefer alternate media channels. Additionally, the UCS 127 may be configured to capture and store data regarding comments from agents, customer communication history, and the like.

The chat automation system 102 may additionally include a knowledge management server 150 for facilitating interactions between customers operating the end user devices 108a-108c and a knowledge system 152 (which may be included as part of the chat automation system 102 or may be operated remotely by a third party). The knowledge management server 152 is a computer system capable of receiving questions and providing answers as output. According to some example embodiments, the knowledge system may be embodied as IBM Watson®. Of course, any other knowledge system may be used as will be appreciated by a person having ordinary skill in the art. In some embodiments, the knowledge system 152 is an artificially intelligent computer system capable of answering questions posed in natural language by retrieving information from information sources such as encyclopedias, dictionaries, newswire articles, literary works, or other documents submitted to the knowledge system 152 as reference materials, as is well known in the art. Additional details of the knowledge management server is provided in U.S. Pat. No. 9,864,952, issued on Jan. 9, 2018, entitled "Controlled Question and Answer Knowledge System Management Confirming Customer Does Not Want to Terminate/Cancel Service/Relationship," the content of which is incorporated herein by reference.

The chat automation system 102 may additionally include a chat orchestration server 140 for conducting and managing automated/electronic chat communications with end users 106 operating end user devices 108. According to some embodiments, the chat orchestration server 140 may dispatch actual chat conversations to various chat bots or agent chats. The processing logic of the chat orchestration server 140 may be rules driven, and may leverage, for example, intelligent workload distribution protocols and various business rules for routing communications.

Additionally, the chat orchestration server 140 may be configured to facilitate (e.g., supervise and coordinate) self-learning by individual chat bots. For example, prior to characteristics of individual chat bots being modified, the chat orchestration server 140 may determine whether various end user input or feedback that may modify the chat bot is suspicious or malicious (e.g., by searching for or identifying key words or phrases, and/or flagging potential issues for review by an agent).

According to one embodiment, the chat orchestration server 140 is coupled to the interaction server 156, statistics server 132, and/or the like, for allowing automated chat sessions to be escalated/transferred/routed to human agents when appropriate. The chat orchestration server 140 may also be coupled to the knowledge management server 150 for receiving, for example, suggestions on answers to queries posed by customers during an automated chat session, for providing links to knowledge articles, and/or the like. Although the chat orchestration server 140 is depicted in the embodiment of FIG. 1 as being a separate server component, a person of skill in the art should recognize that functionalities of the chat automation server may be incorporated into the multimedia/social media server 154, the knowledge management server 105, the IMR server 122, or the like.

The chat automation system 102 may also include a reporting server 134 configured to generate reports from data aggregated by the statistics server 132. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

The various servers of FIG. 1 may each include one or more processors executing computer program instructions and interacting with other system components for performing the various functionalities described herein. The computer program instructions are stored in a memory and implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the disclosed embodiments.

Figure 2:
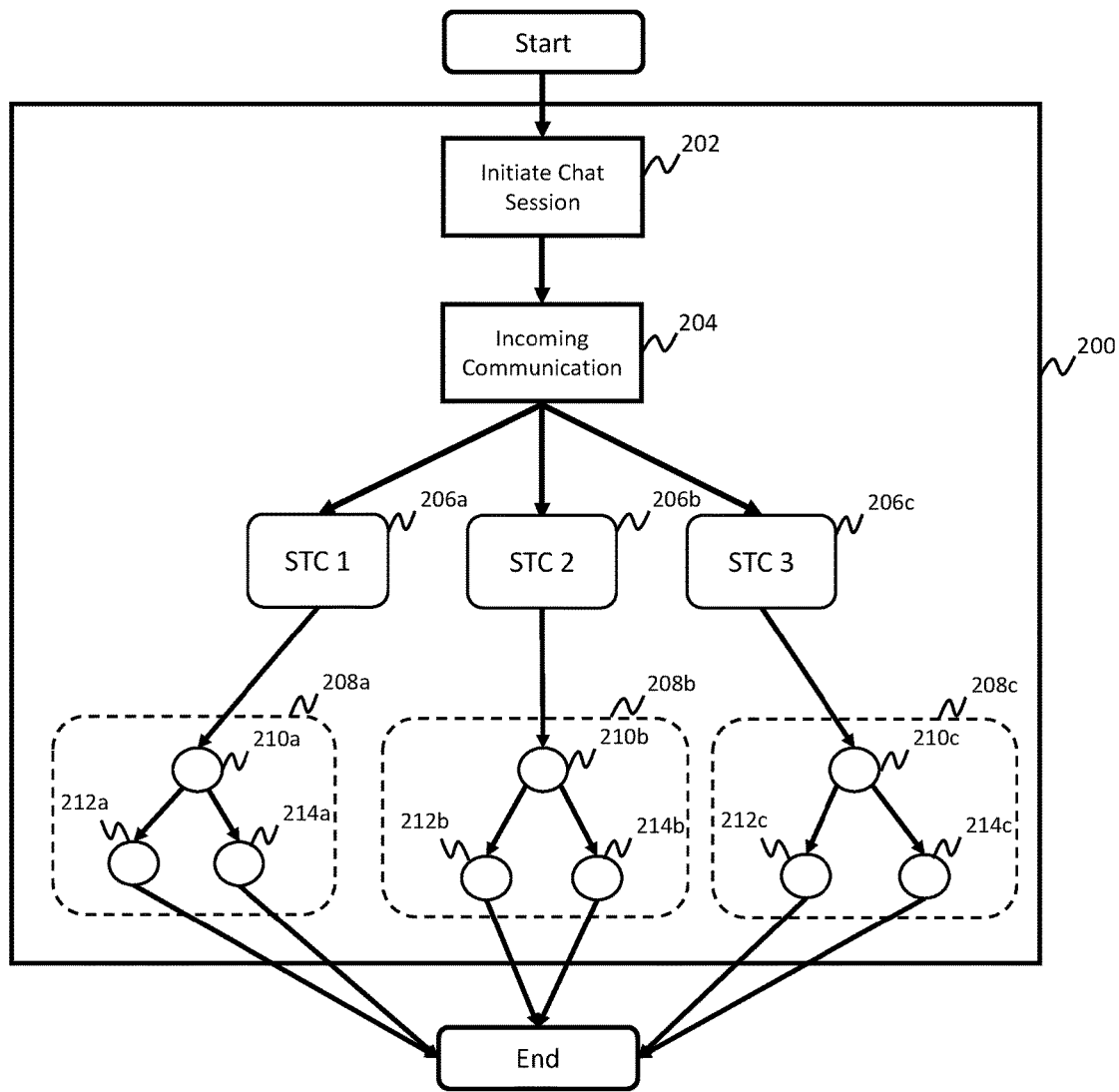
FIG. 2 is an embodiment of a schematic block diagram illustrating a chat orchestration server operating as part of the contact center system.

FIG. 2 is a conceptual layout diagram of potential conversation paths that may be invoked during a chat conversation utilizing a standardized text communication according to a disclosed embodiment.

As illustrated in FIG. 2, a chat communication session 202 is invoked (e.g., as an automated receptionist or concierge) as part of the chat communication system 200, alerting an end user that chat communication is available. For example, the chat session initiation 202 may transmit, by way of the end user interface 160, a message to the end user device 108 a chat or text-based message inquiring as to the purpose/intent of the communication (e.g., "How can I help you today?").

In response, the chat communication system 200, which may be comprised of the chat orchestration server 140 and additional components of chat automation system 102 may receive one or more chat or text-based communications 204 from the end user device 108. The chat communication system 200 may then analyze the text-based communications to identify one or more potential purposes or topics for the communication.

According to a disclosed embodiment, based on an identified purpose or topic for the communication of the end user 106, possibly in conjunction with previous communication history (e.g., with the business 104 or on a third party platform such as a social networking website) of the end user 106, the chat communication system 200 may populate a number of standardized text conversations 206a-c that are deemed to be compatible with the identified purpose or topic for the communication of the end user 106. For example, the chat communication system 200 may identify the purpose or topic of the conversation with the end user 106 that concerns retrieving the customer's billing information from the business 104. In response, the chat communication system 200 may populate a number of standardized text communications (STC) 206a-c concerning customer billing information. The number of standardized text communications (STC) depicted in FIG. 2 is merely illustrative and does not prescribe the number of standardized text communications (STC) that may be populated in response to an identified purpose or topic of conversation from the received one or more chat or text-based communications 204. Additionally, according to some embodiments, in circumstances in which the chat communication system 200 is unable to identify a topic or purpose, the chat communication system 200 may not populate any standardized text communications (STC) and necessitate a direct response from a live agent.

According to a disclosed embodiment, each of the standardized text communications (STC) 206a-c may have various conversation paths or scripts that it may follow based on, for example, the customer intent. According to a disclosed embodiment, the chat communication system 200 may identify or calculate a confidence level of the purpose of the communication for each of the standardized text communications (STC) among a plurality of different possible communication purposes or paths 208a-208c (collectively 208) that are predetermined. The number of possible predetermined communication or conversation paths or purposes may vary according to the design and function of the chat communication system 200 and is not limited to the number illustrated in FIG. 2. The chat communication system 200, however, may be designed such that all (or substantially all) communications conducted with an end user can be categorized into a finite number of categories (e.g., account support, product or service technical support, sales, billing, other, etc.). By way of example, the chat communication system 200, having received indication that standardized text communication 1 (STC 1) 206a has been selected, may proceed with traversing through subsequent steps or stages along the communication paths 208a.

A number of conversation messages 210a-c (collectively 210), 212a-c (collectively 212), and 214a-c (collectively 214) may be contained within each of the communication paths 208a-c, respectively. Selection of a communication path 208a may prompt the chat communication system 200 to include conversation message 210a into a communication with end user 106. A response from the end user 106 to the conversation message 210a may prompt the communication path 208a to proceed to including conversation message 212a or conversation message 214a, depending on the content of the response from the end user 106, as further discussed below. The communication paths 208 depicted in FIG. 2 should not be seen as prescribing or limiting the number of conversation messages 210-214 that may be contained within a communication path 208, as the number of conversations messages 210-214 shown in FIG. 2 is merely for illustrative purposes.

Standardized text conversations 206 can be suggested for use based on what input the customer is providing during the real-time chat. Minimal training data is required and the limited-purpose chatbots can be easily configured by a contact center without much prior knowledge.

According to a disclosed embodiment, an inquiry from an end user 106 to a contact center system 100 for a business 104 that sells the end user 106 goods or services (e.g., a retail business or a utility company) requesting to see a recent billing statement for the end user 106, an example expected input needed to retrieve that information would include the customer's name, birthdate, and address. Standardized text conversation could be implemented to input this customer information instead of requiring the agent to input prompts one-by-one for the customer information. As an example, when the agent selects the "Get Customer Bill" standardized text conversation from the agent device 130, a short chat conversation is had by the standardized text conversation system with the customer to gather the required information. During that time, the agent would be free to work on other assigned chats while the system gets the above-required information from the customer, as a call center system 100 may require an agent to handle more than one chat conversation at the same time. Agents are notified of new incoming chats on a particular interaction by having the chat window in the agents' user interface for that interaction popped to the front. A chat window in the agents' user interface may notify the agent when a standardized text conversation has ended by having the window of that interaction popped to the front of the agent device 130.

When the standardized text conversation system has completed the selected standardized text conversation, the standardized text conversation alerts the agent and the standardized text conversation presents the agent with the information gathered. When it is time for the agent to re-engage with the customer after the standardized text conversation has completed the conversation with the customer, the chat window for that interaction would pop to the front to alert the agent, according to a workflow the agent is assigned to follow. After reengaging with the customer, the agent would proceed with the chat as normal without the use of a standardized text conversation, or the agent could select another standardized text conversation to continue the conversation with the customer on the agent's behalf. Alternatively, the standardized text conversation could act on the information received through the standardized text conversation to perform an action, such as automatically retrieving the customer's bill. Since the contact center would have the customer data that the standardized text conversation had gathered, an API call or a database query could be utilized to bring up the customer's bill for the agent to review as part of the chat, or the customer's bill could be sent directly to the customer.

The chat bots that comprise the standardized text conversation may be live-trained to improve the standardized text conversation system. The training can be based on which standardized text conversations 206 the agent picks while interacting with the customer. The system live trains the standardized text conversations 206 based on inputs to the standardized text conversation system including the incoming customer messages and the particular standardized text conversation(s) that the agent selects. The standardized text conversation system can then utilize the live-trained standardized text conversation to be able to suggest appropriate standardized text conversations 206 to an agent in the future based on the inputs provided from the customer through the chat. For example, during a first iteration of the standardized text conversation system, a customer inputs into the webchat "Can I see my bill?" and the agent selects the "Get Customer Bill" standardized text conversation. The standardized text conversation system utilizes this input and agent selection as part of the live training of the standardized text conversation system. During the next iteration, for example, in response to a new customer inputting into the webchat "I'd like to see my bill", the standardized text conversation system would suggest to the agent to use the "Get Customer Bill" standardized text conversation at that time.

In a disclosed embodiment, standardized text conversations 206 that are utilized for retrieving data from customers by prompting specific questions can be configured so that the standardized text conversation system flags when the requested data has been previously retrieved and will not prompt the customer for the same information on a later interaction. For example, if the agent uses multiple standardized text conversations 206, the first standardized text conversation could require the customer's date of birth. If the second standardized text conversations 206 the agent selects requires the customer's date of birth and the last four digits of the customer's social security number, the system would understand that it had already retrieved the customer's date of birth in the first standardized text conversation and would not prompt the customer for the customer's date of birth in the second standardized text conversations 206.

In a disclosed embodiment, a standardized text conversation can also retry the same question when the customer fails to answer the question prompted by the standardized text conversation on a first attempt. The standardized text conversation system can configure the number of retries for attempting to retrieve responsive information from a customer during a conversation. When the limit to the number of retries is reached without successfully retrieving responsive information from a customer, the standardized text conversation system would interrupt the process, end the standardized text conversation, and alert the agent that the standardized text conversation has failed and agent engagement is required. The standardized text conversation system can alert the agent in this situation by bringing the interaction to focus, such as by bringing the conversation to the front of the agent's user interface. In the interrupt process, the data that has been retrieved by standardized text conversation system in the standardized text conversation can be presented to the agent to provide the agent with information to continue the conversation with the customer.

In a disclosed embodiment, the standardized text conversation system can be configured to create more complex standardized text conversations 206 from simpler standardized text conversations 206. An example of a simple standardized text conversation could be a customer requesting a copy of the customer's bill, which may only require inputs of the customer's name, date of birth and last four digits of their social security number to retrieve the bill. An example of a more complex standardized text conversation is adding a new service for the user, which may require all of the inputs for the simple conversation of retrieving the customer's bill, plus additional inputs from the customer such as identification of services the customer desires adding. The simple standardized text conversation to retrieve a bill may be used to create the complex standardized text conversation to add a new service for the customer.

TABLE 2

```
"data": [
  {
    "id": "name",
    "entity": "wit$",
    "doc": "The customer's full name.",
    "parse": [
      "let names = data.split(/[ ]+/);",
      "let parsedData = { };",
      "parsedData.name = data;",
      "parsedData.name = names[0];",
      "if (names.length > 1) {parsedData.last_name = names[1]}"
      "return parsedData;"
    ],
    "training": [
      {
        "text": "My name is <Adam Johnson>.",
        "intent": "name"
      },
      {
        "text": "<Bob Smith>",
        "intent": "name"
      },
      {
        "text": "<Charles Jones> is my name.",
        "intent": "name"
      }
    ]
  },
]
[
  {
    "id": "get_customer_info",
    "name": "Get Customer Info",
    "prereqs": [ ],
    "steps": [
      {
        "statement": "Let's see if I have all the info I need from you."
      },
      {
        "data": "name",
        "question": "Can I get your name?",
        "retry_phrase": "I didn't get that.",
        "success_phrase": "Great!"
      },
      {
        "data": "account_id",
        "question": "Can I get your account ID?",
        "retry_phrase": "I didn't get that.",
        "success_phrase": "Great!"
      }
    ]
  },
  {
    "id": "get_customer_bill",
    "name": "Get Customer Bill",
    "prereqs": [
      {
        "conversation": "get_customer_info"
      }
    ],
    "steps": [
      {
        "statement": "Alright, <first_name>, I'm getting your bill for account <account_id>."
      }
    ]
  }
]
```

The code above (Table 2) shows an exemplary standardized text conversation of "get_customer_info". The "get_customer_info" standardized text conversation checks if it has the customer's name, date of birth, and account ID and asks for each of those from the customer if the system does not already have this information. The "get_customer_bill" standardized text conversation uses "get_customer_info" as a prerequisite so the standardized text conversation system will first use "get_customer_info"

to retrieve the customer's name, date of birth, and account ID before proceeding with additional steps to retrieve the customer's bill. In this way, complex conversations can be built easily by making simpler conversations prerequisites of more complex conversations. The standardized text conversation system will follow the aforementioned steps and ask the questions to gather the requisite information that has not already been retrieved, and will use that inputted information to perform the "steps" for the "get_customer_info" standardized text conversation.

According to a disclosed embodiment, the standardized text conversation system includes a functionality for notifying the agent that the particular selected standardized text conversation has been completed after receiving all of the requisite inputs from the customer, or has failed to gather the requisite inputs from the customer after a number of attempts, or has otherwise failed in its task. Should the standardized text conversation system determine that a customer does not appear to be answering the prompts from the standardized text conversation with responsive information, the standardized text conversation should be able to notify the agent as soon as practical so the agent can reengage the interaction with the customer to ensure the customer has a positive experience with the interaction. An agent could reengage the conversation with the customer by bringing the chat interaction window to focus in the agent's workspace. The method the agent is alerted to for reengaging a failed standardized text conversation can also be the same method for when a new chat message is received by an agent. In this way, the chat with the customer can be in the background of the agent's workspace while a standardized text conversation is being executed and the agent will know the chat needs the attention of the agent when the chat returns to the front of the agent's workspace.

In a disclosed embodiment, the standardized text conversation system may be able to coordinate with other systems and/or servers in the contact center system and/or other systems and/or servers as part of the business or enterprise outside of the contact center system. In the example of a standardized text conversation retrieving a customer's bill, the standardized text conversation system may be able to automatically retrieve the customer's bill based on completing the standardized text conversation. Additionally, in the same example, the standardized text conversation system can suggest knowledge base articles based on the conversation topic to assist the agent during the chat with the customer. By way of another example, for a standardized text conversation configured to retrieve information needed to verify the customer's identity and retrieve his account balance, the standardized text conversation might ask for name, address, date of birth, and last four digits of the customer's social security number. Once that information is retrieved, the standardized text conversation system could be scripted to act on that information in a customized way. The chat orchestration server could script the standardized text conversation system to automatically make an API call into the call center company's data systems providing the required data and return the account balance directly into the chat with the customer without any agent interaction.

In another embodiment, the chat orchestration server may be able to present a UI for data input. Some channels support customer UIs sent to the customer to retrieve information, for example, dates. By way of example, a use case for this might be a standardized text conversation that is configured to require the customer's date of birth. Instead of trying to retrieve this data by asking for the birthdate and trying to recognize the answer, where possible the standardized text conversation could present a data picker dialog to the customer to allow for a more seamless exchange of information and ensure more sanitized input.

Figure 3:
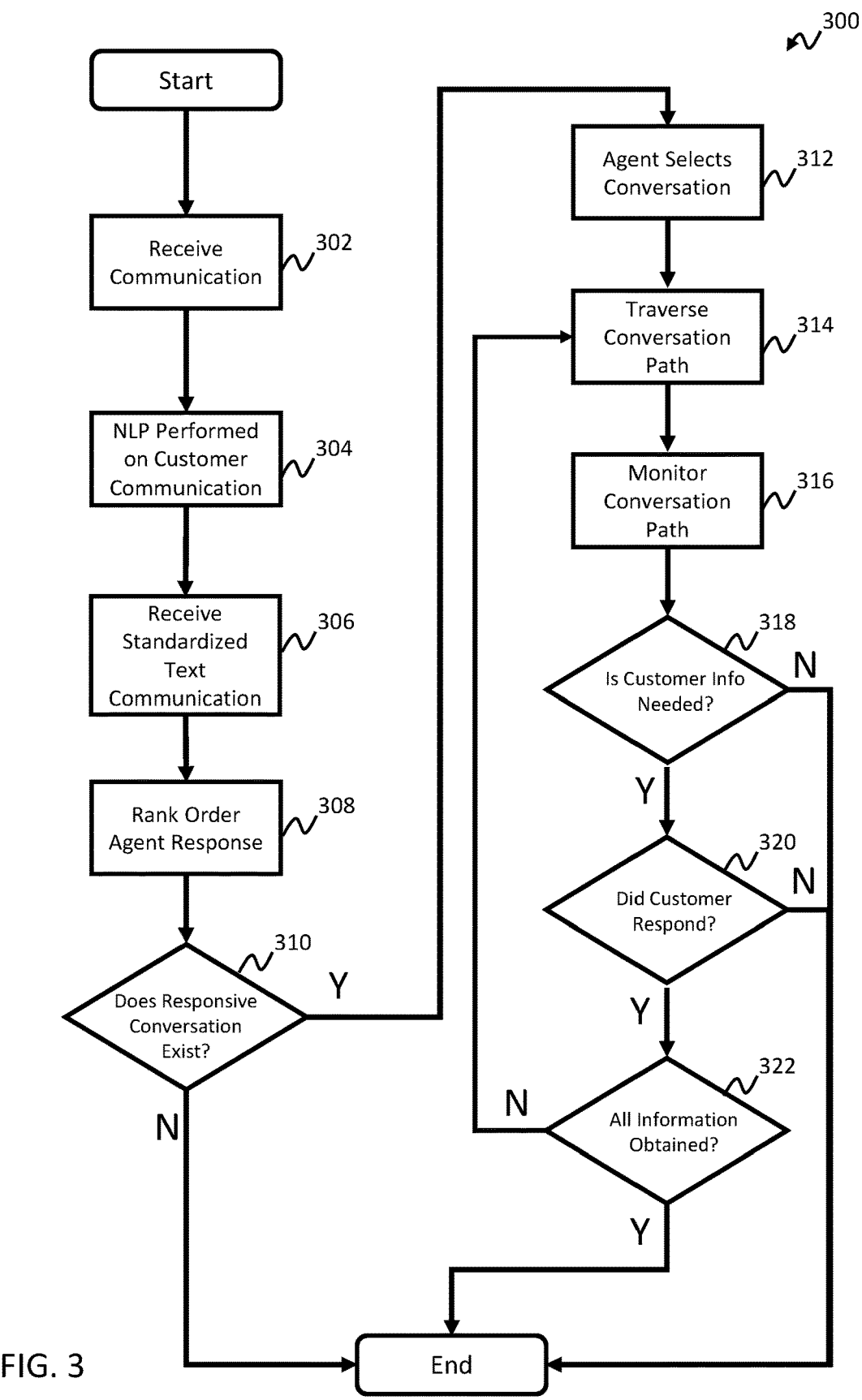
FIG. 3 is an embodiment of a flow diagram illustrating a method of managing a hybridized chat orchestration system.

FIG. 3 is a flow diagram for a method of managing a chat orchestration system according to some of the disclosed embodiments.

The method 300 starts and, at operation 302, the chat orchestration server 140 receives an incoming communication. For example, an end user 106 may access, via an end user device 108, a chat communication user interface (e.g., through an Internet website) operated by or on behalf of the business 104, to transmit a request for interaction with the contact center. The chat communication interface may, for example, be facilitated by the chat orchestration server 140 and the end user interface 160. The incoming chat communication may be a new communication from an end user 106 or could be the continuation of an ongoing communication from end user 106. The chat orchestration server 140 may prompt the end user 106 for topic information for the chat communication. For example, according to some embodiments, the chat orchestration server 140 may directly ask one or more questions to the end user 106 inquiring as to the nature or purpose of the chat communication (e.g., "How may I help you today?"). According to some embodiments, the chat orchestration server 140 may receive input from the end user 106 from which the chat orchestration server 140 can determine or infer the nature or purpose of the chat communication, without the chat orchestration server 140 first inquiring about the purpose of the chat communication. That is, in some instances, the end user 106 may initiate the chat communication with the chat orchestration server 140 and proactively describe the purpose of the communication.

At operation 304, the chat orchestration server 140 identifies an incoming chat communication and utilizes natural language processing (NLP) on the incoming chat communication from the end user 106. The natural language processing for the standardized text conversations 206 can utilize currently-known NLP solutions, such as wit.ai, api.ai, luis.ai, and IBM Watson. The standardized text conversations 206 can be comprised of at least a plurality of limited-purpose chat bots, or "mini" chat bots, that are designed to have small conversations with customers on behalf of agents. The limited-purpose chat bots can gather information from customers without agent intervention. The limited-purpose chat bots are trained to provide intents and entities (information such as a name or birthday) derived from Natural Language Processing. The information gathered by the limited-purpose chat bots can be that used to handle typical customer issues for the business operating the contact center deploying the standardized text conversations 206. In a disclosed embodiment, the limited-purpose chat bots can parse one incoming chat communication into multiple entities. For example, receiving an entity of a full name can be parsed into multiple entities—first name and last name. Regular expressions may also be used when data has a clear format, such as an account number. Training sentences may also be provided to get NLP, such as wit.ai, started.

TABLE 1

"data": [
  {
    "id": "name",
    "entity": "wit$",
    "doc": "The customer's full name.",
    "parse": [

TABLE 1-continued

```
      "let names = data.split(/[ ]+/);",
      "let parsedData = { };",
      "parsedData.name = data;",
      "parsedData.name = names[0];"
      "if (names.length > 1) {parsedData.last_name = names[1]}"
      "return parsedData;"
    ],
    "training": [
      {
        "text": "My name is <Adam Johnson>.",
        "intent": "name"
      },
      {
        "text": "<Bob Smith>",
        "intent": "name"
      },
      {
        "text": "<Charles Jones> is my name.",
        "intent": "name"
      }
    ]
  },
]
```

The above code (Table 1) is a snippet of exemplary training data to train the standardized text conversation system to recognize when a customer is providing their name in natural language according to a disclosed embodiment, utilizing a name as an example of an entity in Natural Language Processing. This example uses wit.ai and its built-in wit$contact entity which represents names. This allows the standardized text conversation system to recognize the typical statements used to provide a name and where in the sentence the name would typically reside. Beyond that, the above example has some additional code which parses the entity that is detected, for example, the customer's name, and further splits that up into first and last name if both are provided.

At operation 306, the chat orchestration server 140 is presented with a number of standardized text conversations 206 in response to NLP-processed incoming chat communication. The number of responsive standardized text conversations 206 presented to the chat orchestration server 140 may be determined by a predetermined number (i.e. send three standardized text conversations 206), or by a responsiveness threshold (i.e. send as many standardized text conversations 206 that exceed a certain confidence level for responsiveness), or by a combination thereof, or by other means to select a number of standardized text conversations 206. After the standardized text conversations 206 are provided to the chat orchestration server 140, method 300 proceeds to operation 306.

At operation 308, the chat orchestration server 140 provides a rank order of a number of standardized text conversations 206 with identifications of each of the number of standardized text conversations to an agent device 130. The chat orchestration server 140 ranks the standardized text conversations 206 in order of best-fitting standardized text conversations 206. The chat orchestration server 140 matches the most likely responsive standardized text conversation with a topic of conversation identified in the NLP-processed incoming chat communication. The chat orchestration server 140 can then repeat the matching processes, matching the NLP-processed incoming chat communication with additional standardized text conversations 206 and present the additional standardized text conversations 206 as additional options. The number of standardized text conversations 206 presented to the agent device 130 can be limited by a preset number of standardized text conversation. Alternatively, the number of standardized text conversations 206 presented to the agent device 130 can be limited by a confidence level set for each standardized text communication, wherein the chat orchestration server 140 will only present standardized text conversations 206 that have reached a certain threshold level based on the matching with the NLP-processed incoming chat communication. Alternatively, a hybrid of preset number of conversations and confidence levels may be used, or other means of ranking the matched standardized text conversations 206 to present a certain number of standardized text conversations 206 to the agent device 130.

At operation 310, the chat orchestration server 140 receives an input from the agent device 130 in determining whether any of the rank-order presented standardized text conversations 206 presented to the agent device 130 at operation 308 are responsive to the inquiry from the end user 106. In a disclosed embodiment, the agent device 130 provides a specific indication that one of the presented standardized text conversations 206 is or is not responsive to the inquiry from the end user 106. In another disclosed embodiment, the agent device 130 sends a signal to the chat orchestration server 140 indicating either (1) the selection of one of the rank-order presented standardized text conversations 206, or (2) that none of the rank-order presented standardized text conversations 206 were responsive to the inquiry from the end user 106. If the chat orchestration server 140 receives a signal indicating there is no responsive standardized text conversation, then the method 300 ends. If the chat orchestration server 140 receives a signal indicating a responsive standardized text conversation, then the method 300 proceeds to operation 312.

At operation 312, the chat orchestration server 140 receives an input from the agent device 130 selecting one of the rank-order presented standardized text conversations 206. The chat orchestration server 140 will then proceed with initiating the selected standardized text conversation utilizing the chat bot appropriate for the selected standardized text conversation.

Once a conversation path is selected, the selected conversation path may be traversed, at operation 314. To that end, a selected standardized text conversation may, for example, ask and answer various questions to and from the end user 106, by way of the end user interface 160, to attempt to obtain all of the information needed for the identified topic of the standardized text conversation.

During the chat communication session, the chat orchestration server 140 may monitor, at operation 316, the chat communication conversation (e.g., the input received from the end user 106) for various trigger events and calculate and/or modify the confidence level that the selected chat loot is appropriately handling the chat communication session. For example, the chat orchestration server 140 may monitor the language received from the end user 106 and detect language indicating whether or not the chat orchestration server 140 is receiving satisfactory answers to questions asked in the standardized text conversation. The chat orchestration server 140 may also monitor the language received from the end user 106 to detect whether or not the end user 106 is satisfied, frustrated, confused, or is understanding the output from the chat orchestration server 140.

At operation 318, the chat orchestration server 140 determines whether additional information is required from the customer to complete the standardized text conversation. If no additional information is required from the end user 106 to complete the standardized text conversation, then the method 300 ends. If additional information is required from the end user 106 to complete the standardized text conversation, the chat orchestration server 140 implementing the standardized text conversation will present the next question to the end user 106, and then the process continues to operation 320.

At operation 320, the chat orchestration server 140 determines whether customer provided responsive information to the question posed from the result of operation 318. In a manner similar to operation 304, the chat orchestration server 140 identifies the incoming chat communication in response to the question posed and utilizes natural language processing (NLP) on the incoming chat communication from the end user 106. The chat orchestration server 140 uses NLP to determine intents and entities of the received communication. If the chat orchestration server determines the NLP-processed incoming communication is not responsive to the question posed to the end user 106 from operation 318, then the method 300 ends. If the chat orchestration server determines the NLP-processed incoming communication is responsive to the question posed to the end user 106 from operation 318, then the process continues to operation 322.

In a disclosed embodiment, operation 320 can also repeat for a certain number of retries on a particular question posed to the end user. The number of retries can be determined by a number of preset criteria, which could include a maximum number of retries, a set confidence level for NLP-processed incoming communication, and/or a set number of keywords identifiable by the chat orchestration server 140 (i.e., looking for keywords signifying the end user's unhappiness with the conversation and agent intervention is required).

At operation 322, the chat orchestration server 140 determines whether all of the information required for the standardized text conversation has been obtained from the end user 106. For example, if three pieces of identifying customer information is required to complete the standardized text conversation (e.g., name, date of birth, and last four digits of social security number), and the end user 106 has only provided one of the identifying customer information, then additional information is required from the end user 106. If the chat orchestration server 140 determines that all of the information has been obtained from the end user 106, then the method 300 ends. If the chat orchestration server 140 determines that additional information is required to complete the standardized text conversation, then the process returns to step 314 to continue traversing the conversation path.

Figure 4:
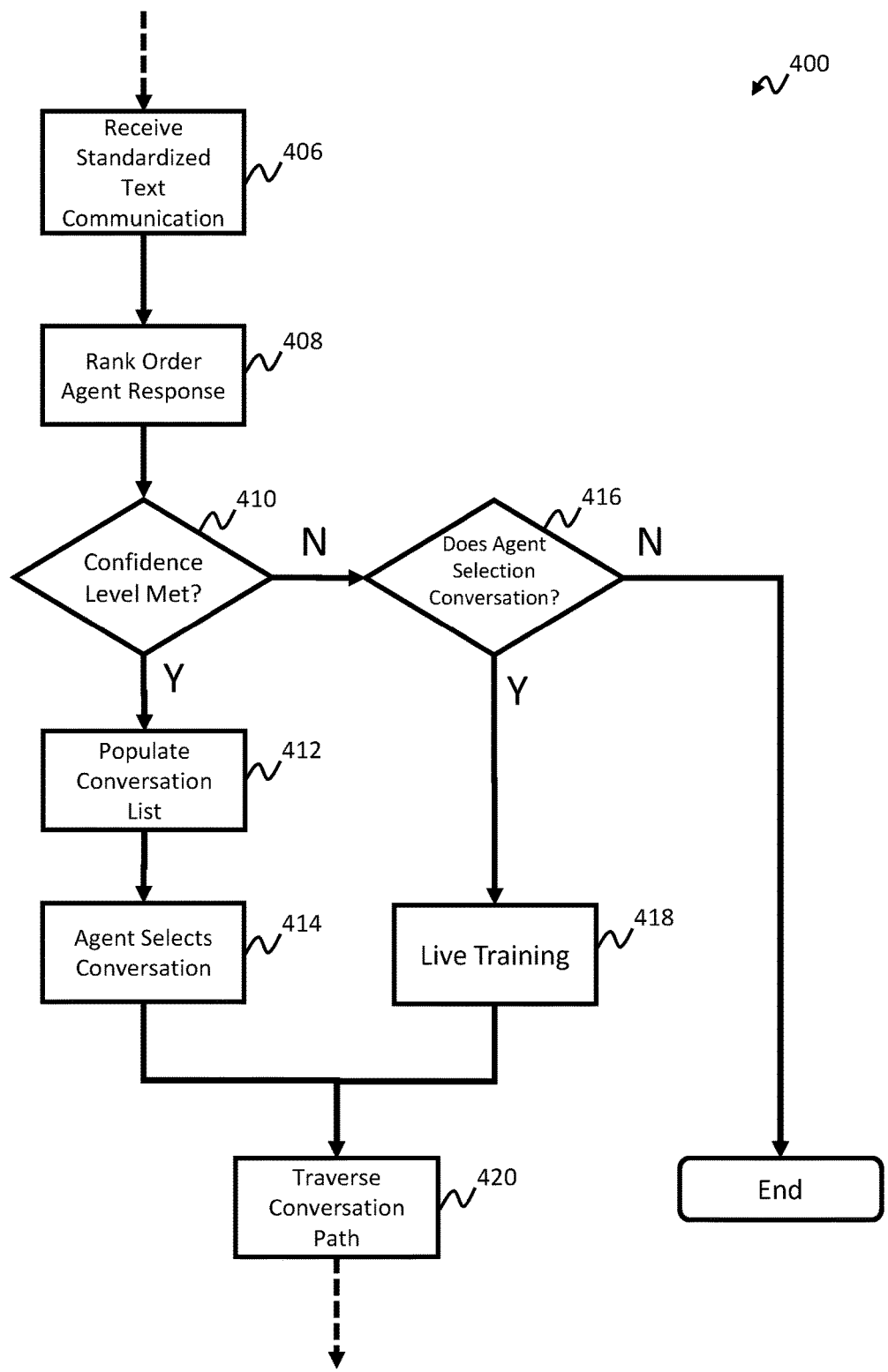
FIG. 4 is an embodiment of a flow diagram illustrating a method of managing a hybridized chat orchestration system.

FIG. 4 is a flow diagram for a method, in part, of managing a chat orchestration system according to a disclosed embodiment. In particular, FIG. 4 is an exemplary embodiment of live training the standardized text conversation system.

The method 400 starts in a manner similar to method 300, whereby operation 406 includes the step of the chat orchestration server 140 identifies an incoming chat communication and utilizes natural language processing (NLP) on the incoming chat communication from the end user 106; and then operation 408 includes the step of the chat orchestration server 140 utilizing the NLP-processed incoming chat communication and provides a rank order of a number of standardized text conversations 206 with identifications of each of the number of standardized text conversations 206 to an agent device 130. Operation 406 can be performed utilizing the same methods described herein for operation 304 as part of method 300. Operation 408 can be performed utilizing the same methods described herein for operation 308 as part of method 300.

At operation 410, the chat orchestration server 140 determines a confidence level for the rank-order presented standardized text conversations 206. The confidence level for the rank-order presented standardized text conversations 206 determines how well-fitting the standardized text conversations 206 match with the NLP-processed customer communication. For example, an NLP-processed customer communication that determines the topic of the customer conversation is "billing" may have a high confidence level for the presented standardized text conversations 206 concerning billing. Conversely, an NLP-processed customer communication that determines the topic of the customer conversation pertains to "finance" may have a low confidence level for the presented standardized text conversations 206 concerning billing.

If the chat orchestration server 140 determines the confidence level for the rank-order presented standardized text conversations 206 is above a confidence level, either a preset level or dynamically set level, then method 400 proceeds to populate conversation list 412 of agent device 130. After populate conversation list 412 is completed, method 400 proceeds to have the agent select conversation 414 from the populated conversation list 412, and in turn proceeds to traverse the conversation path 420. Operation 414 can be performed utilizing the same methods described herein for operation 312 as part of method 300. Operation 420 can be performed utilizing the same methods described herein for operation 314 as part of method 300. Method 400 may then continue through traversing the conversation path 420 as following from traversing the conversation path 314 in method 300.

If the chat orchestration server 140 determines the confidence level for the rank-order presented standardized text conversations 206 is below a confidence level, either a preset level or a dynamically set level, chat orchestration server 140 running the standardized text conversation system will receive a signal from the agent device 130 as to whether the agent selected a standardized text conversation 416 in response to the customer communication. As part of whether the agent selects a conversation 416, a certain number of the rank order agent responses 408 may be displayed on the agent device 130, or all currently available standardized text conversations 206 may be displayed on the agent device 130. If the received signal from the agent device 130 indicates that the agent does not select a standardized text conversation in response to the customer communication, then method 400 ends. If the received signal from the agent device 130 indicates that the agent does select a standardized text conversation in response to the customer communication, then method 400 proceeds to operation 418.

At operation 418, the chat orchestration server 140 live trains the standardized text conversation as indicated selected by the agent at operation 416. The live training 418 will increase the association between the determined topic of NLP-processed communication 406 and the agent-selected standardized text conversation 416. Accordingly, in future iterations of method 400 by the chat orchestration server 140, the same NLP-processed communication topic from the customer will more likely be over the established confidence level, and thus more likely to be directly populated to the agent device 130 and improve the efficiency of the standardized text conversation system. Method 400 proceeds to traverse the conversation path 420 as it would if the agent selected a standardized text conversation that had been above the confidence level 410.

In an embodiment, each of the various servers, controls, switches, gateways, engines, and/or modules (collectively referred to as servers) in the described figures are implemented via hardware or firmware (e.g., ASIC) as will be appreciated by a person of skill in the art. Each of the various servers may be a process or thread, running on one or more processors, in one or more computing devices (e.g., FIGS. 5A, 5B), executing computer program instructions and interacting with other system components for performing the various functionalities described herein. The computer program instructions are stored in a memory which may be implemented in a computing device using a standard memory device, such as, for example, a RAM. The computer program instructions may also be stored in other non-transitory computer readable media such as, for example, a CD-ROM, a flash drive, etc. A person of skill in the art should recognize that a computing device may be implemented via firmware (e.g., an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the disclosed embodiments. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 5A:
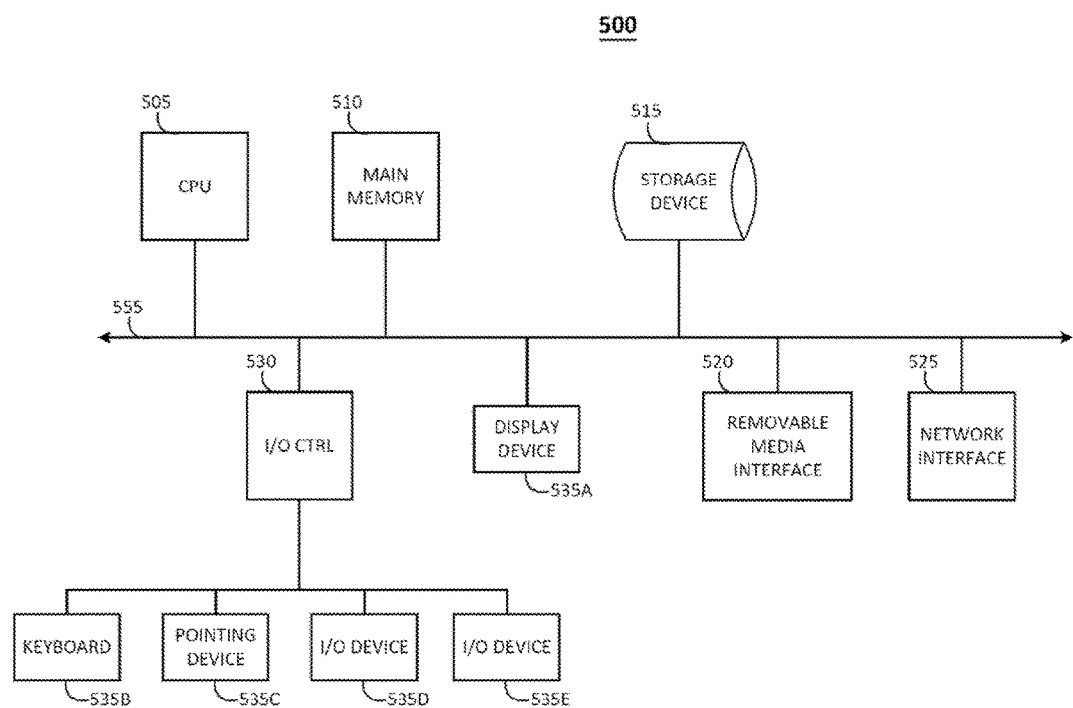
FIG. 5A is a diagram illustrating an embodiment of a computing device.
Figure 5B:
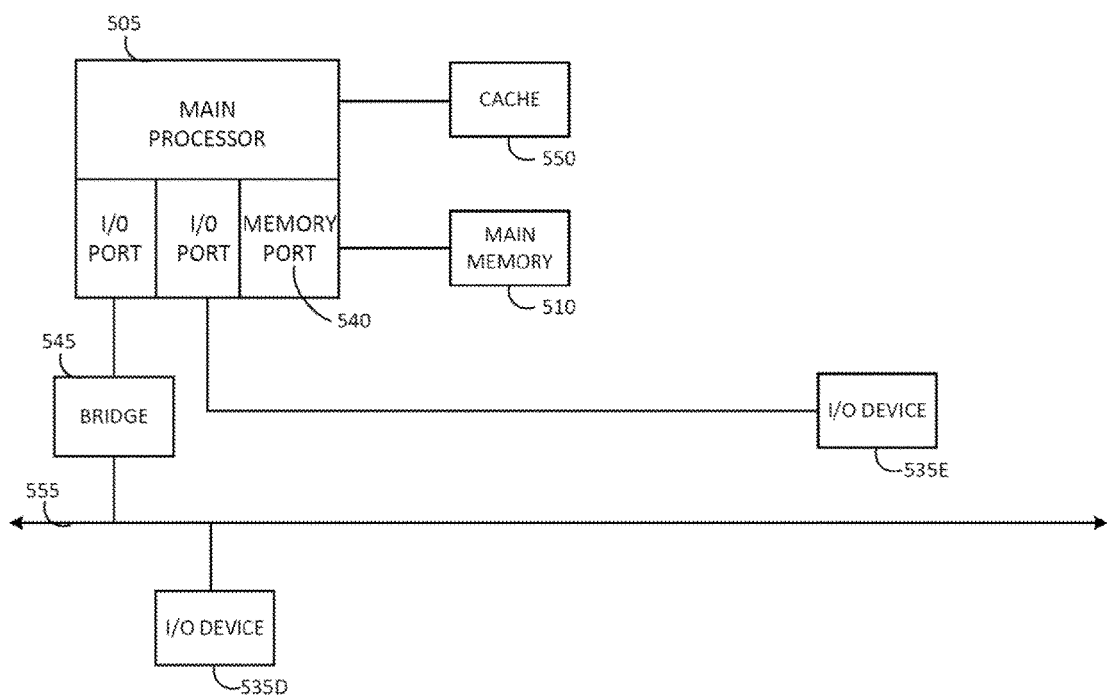
FIG. 5B is a diagram illustrating an embodiment of a computing device.

FIGS. 5A and 5B are diagrams illustrating an embodiment of a computing device as may be employed in an embodiment of the invention, indicated generally at 500. Each computing device 500 includes a CPU 505 and a main memory unit 510. As illustrated in FIG. 5A, the computing device 500 may also include a storage device 515, a removable media interface 520, a network interface 525, an input/output (I/O) controller 530, one or more display devices 535A, a keyboard 535B and a pointing device 535C (e.g., a mouse). The storage device 515 may include, without limitation, storage for an operating system and software. As shown in FIG. 5B, each computing device 500 may also include additional optional elements, such as a memory port 540, a bridge 545, one or more additional input/output devices 535D, 535E, and a cache memory 550 in communication with the CPU 505. The input/output devices 535A, 535B, 535C, 535D, and 535E may collectively be referred to herein as 535.

The CPU 505 is any logic circuitry that responds to and processes instructions fetched from the main memory unit 510. It may be implemented, for example, in an integrated circuit, in the form of a microprocessor, microcontroller, or graphics processing unit, or in a field-programmable gate array (FPGA) or application-specific integrated circuit (ASIC). The main memory unit 510 may be one or more memory chips capable of storing data and allowing any storage location to be directly accessed by the central processing unit 505. As shown in FIG. 5A, the central processing unit 505 communicates with the main memory 510 via a system bus 555. As shown in FIG. 5B, the central processing unit 505 may also communicate directly with the main memory 510 via a memory port 540.

In an embodiment, the CPU 505 may include a plurality of processors and may provide functionality for simultaneous execution of instructions or for simultaneous execution of one instruction on more than one piece of data. In an embodiment, the computing device 500 may include a parallel processor with one or more cores. In an embodiment, the computing device 500 comprises a shared memory parallel device, with multiple processors and/or multiple processor cores, accessing all available memory as a single global address space. In another embodiment, the computing device 500 is a distributed memory parallel device with multiple processors each accessing local memory only. The computing device 500 may have both some memory which is shared and some which may only be accessed by particular processors or subsets of processors. The CPU 505 may include a multicore microprocessor, which combines two or more independent processors into a single package, e.g., into a single integrated circuit (IC). For example, the computing device 500 may include at least one CPU 505 and at least one graphics processing unit.

In an embodiment, a CPU 505 provides single instruction multiple data (SIMD) functionality, e.g., execution of a single instruction simultaneously on multiple pieces of data. In another embodiment, several processors in the CPU 505 may provide functionality for execution of multiple instructions simultaneously on multiple pieces of data (MIMD). The CPU 505 may also use any combination of SIMD and MIMD cores in a single device.

FIG. 5B depicts an embodiment in which the CPU 505 communicates directly with cache memory 550 via a secondary bus, sometimes referred to as a backside bus. In other embodiments, the CPU 505 communicates with the cache memory 550 using the system bus 555. The cache memory 550 typically has a faster response time than main memory 510. As illustrated in FIG. 5A, the CPU 505 communicates with various I/O devices 535 via the local system bus 555. Various buses may be used as the local system bus 555, including, but not limited to, a Video Electronics Standards Association (VESA) Local bus (VLB), an Industry Standard Architecture (ISA) bus, an Extended Industry Standard Architecture (EISA) bus, a Micro Channel Architecture (MCA) bus, a Peripheral Component Interconnect (PCI) bus, a PCI Extended (PCI-X) bus, a PCI-Express bus, or a NuBus. For embodiments in which an I/O device is a display device 535A, the CPU 505 may communicate with the display device 535A through an Advanced Graphics Port (AGP). FIG. 5B depicts an embodiment of a computer 500 in which the CPU 505 communicates directly with I/O device 535E. FIG. 5B also depicts an embodiment in which local buses and direct communication are mixed: the CPU 505 communicates with I/O device 535D using a local system bus 555 while communicating with I/O device 535E directly.

A wide variety of I/O devices 535 may be present in the computing device 500. Input devices include one or more keyboards 535B, mice, trackpads, trackballs, microphones, and drawing tables, to name a few non-limiting examples. Output devices include video display devices 535A, speakers and printers. An I/O controller 530 as shown in FIG. 5A, may control the one or more I/O devices, such as a keyboard 535B and a pointing device 535C (e.g., a mouse or optical pen), for example.

Referring again to FIG. 5A, the computing device 500 may support one or more removable media interfaces 520, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 535 may be a bridge between the system bus 555 and a removable media interface 520.

The removable media interface 520 may, for example, be used for installing software and programs. The computing device 500 may further include a storage device 515, such as one or more hard disk drives or hard disk drive arrays, for storing an operating system and other related software, and for storing application software programs. Optionally, a removable media interface 520 may also be used as the storage device. For example, the operating system and the software may be run from a bootable medium, for example, a bootable CD.

In an embodiment, the computing device 500 may include or be connected to multiple display devices 535A, which each may be of the same or different type and/or form. As such, any of the I/O devices 535 and/or the I/O controller 530 may include any type and/or form of suitable hardware, software, or combination of hardware and software to support, enable or provide for the connection to, and use of, multiple display devices 535A by the computing device 500. For example, the computing device 500 may include any type and/or form of video adapter, video card, driver, and/or library to interface, communicate, connect or otherwise use the display devices 535A. In an embodiment, a video adapter may include multiple connectors to interface to multiple display devices 535A. In another embodiment, the computing device 500 may include multiple video adapters, with each video adapter connected to one or more of the display devices 535A. In other embodiments, one or more of the display devices 535A may be provided by one or more other computing devices, connected, for example, to the computing device 500 via a network. These embodiments may include any type of software designed and constructed to use the display device of another computing device as a second display device 535A for the computing device 500. One of ordinary skill in the art will recognize and appreciate the various ways and embodiments that a computing device 500 may be configured to have multiple display devices 535A.

An embodiment of a computing device indicated generally in FIGS. 5A and 5B may operate under the control of an operating system, which controls scheduling of tasks and access to system resources. The computing device 500 may be running any operating system, any embedded operating system, any real-time operating system, any open source operation system, any proprietary operating system, any operating systems for mobile computing devices, or any other operating system capable of running on the computing device and performing the operations described herein.

The computing device 500 may be any workstation, desktop computer, laptop or notebook computer, server machine, handled computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 500 may have different processors, operating systems, and input devices consistent with the device.

In other embodiments, the computing device 500 is a mobile device. Examples might include a Java-enabled cellular telephone or personal digital assistant (PDA), a smart phone, a digital audio player, or a portable media player. In an embodiment, the computing device 500 includes a combination of devices, such as a mobile phone combined with a digital audio player or portable media player.

A computing device 500 may be one of a plurality of machines connected by a network, or it may include a plurality of machines so connected. A network environment may include one or more local machine(s), client(s), client node(s), client machine(s), client computer(s), client device(s), endpoint(s), or endpoint node(s) in communication with one or more remote machines (which may also be generally referred to as server machines or remote machines) via one or more networks. In an embodiment, a local machine has the capacity to function as both a client node seeking access to resources provided by a server machine and as a server machine providing access to hosted resources for other clients. The network may be LAN or WAN links, broadband connections, wireless connections, or a combination of any or all of the above. Connections may be established using a variety of communication protocols. In one embodiment, the computing device 500 communicates with other computing devices 500 via any type and/or form of gateway or tunneling protocol such as Secure Socket Layer (SSL) or Transport Layer Security (TLS). The network interface may include a built-in network adapter, such as a network interface card, suitable for interfacing the computing device to any type of network capable of communication and performing the operations described herein. An I/O device may be a bridge between the system bus and an external communication bus.

In an embodiment, a network environment may be a virtual network environment where the various components of the network are virtualized. For example, the various machines may be virtual machines implemented as a software-based computer running on a physical machine. The virtual machines may share the same operating system. In other embodiments, different operating systems may be run on each virtual machine instance. In an embodiment, a "hypervisor" type of virtualizing is implemented where multiple virtual machines run on the same host physical machine, each acting as if it has its own dedicated box. The virtual machines may also run on different host physical machines.

Other types of virtualization are also contemplated, such as, for example, the network (e.g., via Software Defined Networking (SDN)). Functions, such as functions of session border controller and other types of functions, may also be virtualized, such as, for example, via Network Functions Virtualization (NFV).

According to one or more disclosed embodiments, various operations described above may be omitted, or additional operations may be included, unless otherwise indicated, without departing from the spirit and scope of the disclosed embodiments. Additionally, the order of the operations may be modified or changed, unless otherwise stated or implied, without departing from the spirit and scope of the disclosed embodiments.

Many of the functional units of the system in embodiments of the invention may be implemented as code routines in computerized telephony equipment, computer servers, and individual workstations. It is well-known that programmers are highly individualistic and may implement similar functionality by considerably different routines. Also, the invention may be applied to widely varying hardware systems. Further, hardware used to practice the invention may vary in many ways. There are similarly many other alterations in the embodiments described herein which will fall within the spirit and scope of the disclosed embodiments in the several aspects described. The invention is limited only by the breadth of the claims below.

The invention claimed is:

1. A method of managing chat in a contact center setting, wherein the chat comprises a blended agent and automated chat, the method comprising:
   (a) receiving from a chat orchestration server a first signal indicating an initiating communication;
   (b) invoking by the chat orchestration server natural language processing on the initiating communication;
   (c) retrieving, by the chat orchestration server, a standardized text communication responsive to the natural-language-processed communication from a memory coupled to a knowledge management server;
   (d) determining, by the knowledge management server, a confidence value of the standardized text communication responsive to the natural-language-processed communication;
   (e) populating, by the knowledge management server, a determined ranked order of standardized text communications, wherein the rank order is configured in response to the confidence value of the standardized text communication;
   (f) transmitting, by the chat orchestration server, an instruction to display on an agent device the determined ranked order;
   (g) receiving, by the chat orchestration server, a second signal indicating a selection from the agent device of a standardized text communication responsive to the natural-language-processed initiating communication;
   (h) directing, by the chat orchestration server, an automated standardized-text-communication chat for communication with an end user based on the received second signal indicating the selection from the agent device of the standardized text communications; and
   repeating steps (a)-(h) until an action occurs as indicated by a third signal received by the chat orchestration server.

2. The method of claim 1, wherein the initiating communication is a chat-based communication from an end user.

3. The method of claim 2, wherein the end user interacts with the contact center through a webchat.

4. The method of claim 1, wherein step (c) and (d) are repeated for a plurality of standardized text communications responsive to the natural-language-processed communication, and wherein the ranked order of standardized text communications determined in step (e) is comprised of said plurality of standardized text communications responsive to the natural-language-processed communication.

5. The method of claim 1, further comprising the knowledge management server live training the confidence value of the standardized text communication in response to the selection from the agent device of a standardized text communication responsive to the natural-language-processed initiating communication.

6. The method of claim 1, wherein step (d) of determining, by the knowledge management server, a confidence value of the standardized text communication responsive to the natural-language-processed communication comprises:
   (d1) determining, by the knowledge management server, a confidence value of the standardized text communication responsive to the natural-language-processed communication;
   (d2) determining, by the knowledge management server, a threshold for the determined confidence value of the standardized text communication responsive to the natural-language-processed communication; and
   (d3) transmitting, by the knowledge management server, the standardized text communication for population in the ranked order if the determined confidence value meets or exceeds the determined threshold.

7. The method of claim 6, wherein the determined confidence values of a plurality of standardized text communications responsive to the natural-language-processed communication influences the determined threshold.

8. The method of claim 6, wherein the knowledge management server is configured to live train the confidence value of the standardized text communication if the confidence value is below the determined threshold.

9. The method of claim 8, wherein the live training of the confidence value of the standardized text communication is determined in response to the selection from the agent device of a standardized text communication responsive to the natural-language-processed initiating communication.

10. The method of claim 1, wherein the third signal received by the chat orchestration server indicates completion of a chat conversation between the end user and an agent operating the agent device.

11. A system for managing chat in a contact center setting, wherein the chat comprises a blended agent and automated chat, the system comprising:
   a chat orchestration server processor; and
   a memory coupled to the chat orchestration server processor, wherein the memory stores instructions that, when executed by the chat orchestration server processor, cause the chat orchestration server processor to:
      receive a first signal indicating an initiating communication;
      invoke natural language processing on the initiating communication;
      retrieve a standardized text communication responsive to the natural-language-processed communication from a memory coupled to a knowledge management server;
      transmit an instruction to display on an agent device a determined ranked order of standardized text communications;
      receive a second signal indicating a selection from an agent device of a standardized text communication responsive to the natural-language-processed initiating communication; and
      direct an automated standardized-text-communication chat for communication with an end user based on the received second signal indicating the selection from the agent device of the standardized text communications; and
   a knowledge management server processor; and
   a memory coupled to the knowledge management server processor, wherein the memory stores instructions that, when executed by the knowledge management server processor, cause the knowledge management server processor to:

determine a confidence value of the standardized text communication responsive to the natural-language-processed communication; and populate the determined ranked order of standardized text communications, wherein the rank order is configured in response to the confidence value of the standardized text communication.

12. The system of claim 11, wherein the initiating communication is a chat-based communication from an end user.

13. The system of claim 12, wherein the end user interacts with the contact center through a webchat.

14. The system of claim 11, wherein the instructions that cause the chat orchestration server processor to retrieve a standardized text communication responsive to the natural-language-processed communication from a memory coupled to a knowledge management server and the instructions that cause the knowledge management server processor to determine a confidence value of the standardized text communication responsive to the natural-language-processed communication are repeated for a plurality of standardized text communications responsive to the natural-language-processed communication, and wherein the ranked order of standardized text communications populated by the knowledge management server processor is comprised of said plurality of standardized text communications responsive to the natural-language-processed communication.

15. The system of claim 11, further comprising the instructions causing the knowledge management server processor to live train the confidence value of the standardized text communication in response to the selection from the agent device of a standardized text communication responsive to the natural-language-processed initiating communication.

16. The system of claim 11, wherein the instructions further cause the knowledge management server processor to:

determine a threshold for the determined confidence value of the standardized text communication responsive to the natural-language-processed communication; and transmit the standardized text communication for population in the ranked order if the determined confidence value meets or exceeds the determined threshold.

17. The system of claim 16, wherein the determined confidence values of a plurality of standardized text communications responsive to the natural-language-processed communication influences the determined threshold.

18. The system of claim 16, wherein the knowledge management server processor is configured with instructions to live train the confidence value of the standardized text communication if the confidence value is below the determined threshold.

19. The system of claim 18, wherein the live training of the confidence value of the standardized text communication is determined in response to the selection from the agent device of a standardized text communication responsive to the natural-language-processed initiating communication.

20. The system of claim 11, the instructions for the chat orchestration server processor and the knowledge management server are configured to repeat until an action occurs as indicated by a third signal received by the chat orchestration server processor.

* * * * *